INVENTORS
Alfred Kahn
Warren A. Anderson
BY H.D. Grover
ATTORNEY

Patented Oct. 3, 1944

2,359,649

UNITED STATES PATENT OFFICE 2,359,649

MEANS FOR PRODUCING SYNCHRONIZATION AND REGENERATION OF ELECTRIC TELEGRAPH SIGNALS

Alfred Kahn, Hollis, and Warren A. Anderson, New Dorp, Staten Island, N. Y., assignors to Radio Corporation of America, a corporation of Delaware Application November 19, 1942, Serial No. 466,094

21 Claims. (Cl. 178—69.5)

This invention relates to electric telegraph systems.

In prior art phase control systems, such as disclosed in the application of Warren A. Anderson, filed April 30, 1941, Serial No. 391,077, now Patent No. 2,309,622, granted Feb. 2, 1943, failures to correct the phase displacement between an incoming signal having multiple marks and the local source of frequency occasionally resulted, as when the local alternating source was 180° out of the intended phase relation. This could occur, for example, when the system was first started in operation with this 180° phase displacement, though it might sometimes occur through other accidental causes.

It is an object of the present invention to provide means for establishing the desired correction under all conditions of phase displacement.

Another object of the invention is to provide for phase correction at all times even though the local source is reversed from its correct phase relation with the signal.

Another object of the invention is to provide improved means for phasing the receiving devices with those at the transmitter.

Another object is to provide improved means for regenerating the received signal, in combination with means for producing the proper phase relation between the local source of frequency and the incoming signal.

Another object is to generate voltages at the time-center of the received signal marks and spaces for starting and ending the regeneration and to provide means for preventing voltages formed at the start of the signal marks from interfering with this regeneration.

Other objects of the invention will appear in the following description, reference being had to the drawings, in which.

The invention will first be explained in a general manner in connection with Fig. 1, in which it has been applied to a single channel for a synchronous printing system, but this is for illustrative purposes only, as it is equally well capable of use in multiplex and other forms of communication.

It is usual to have at each local station of a communication system both transmitting and receiving apparatus. Fig. 1 illustrates, chiefly in block diagram, such a station. While the present invention relates primarily to the receiving end of the system, a brief description of the transmitting apparatus will be given to enable one better to understand the improvement at the receiving station.

A tape transmitter 1, or other desired signaling apparatus, applies positive and negative voltages to the segments of the distributor 2, though of course on-and-off signals of one polarity could equally well be used. The distributor is shown, but by way of example only, as adapted to a seven-unit code system. A brush 3 is rotated by a synchronous motor 4 at the desired speed. For purposes of illustration it will be assumed that the brush is moving at a baud rate of $426/7$ cycles per second. This is the fourteenth sub-harmonic of the frequency of the tuning fork standard frequency indicated at 5. The output of the frequency standard 5 is fed into a multivibrator or other suitable frequency divider 6, which has suitable wave-shaping devices for producing an output electromotive force of approximately sinusoidal form at this sub-harmonic frequency.

The output of the frequency divider 6 is fed into drive amplifier 7 and its output feeds into the synchronous motor 4. The drive from the motor 4 is such that the brush 3 passes over one of the contacts of the distributor 2 during one complete cycle of the alternating electromotive force from the amplifier 7. In other words, the frequency of the driving electromotive force is the same as the baud rate of the telegraph system, which is equal to twice the channel keying frequency, since it takes two bauds to make a keying cycle.

The signals from the tape transmitter are fed in succession by the rotating brush 3 to keying devices and other apparatus for radio transmission to the distant receiver, though, of course, the signals could equally well be used in wire telegraph transmission.

Signals sent out from a distant station, as has just been described in connection with the local transmitting apparatus of Fig. 1, would be received, detected, amplified and converted to tone signals, as well known in the art. These tone signals are received at the local office over lines 12 and fed into the device 13, which contains a limiter-amplifier and rectifier which are well known in the art. The signal is cut off at the threshold and top-limited and rectified so as to have the form shown in graph A of Fig. 5.

The signals in the output of 13 will usually be distorted due to multipath and other conditions and they are therefore regenerated at 14 to the original form sent out by the distant transmitter, as will be later described in detail.

The output of the regenerator 14 is fed into relay 15 so that the tongue 16 contacts the positive terminal of the relay for mark and the negative terminal for space, or vice versa, as the case may be. Thus, signals equivalent to those transmitted are fed to the rotating brush 17, driven by synchronous motor 18 of a distributor system 19, similar to the distributor of the distant transmitting apparatus, which, as stated, is similar to the local transmitting distributor 2.

The transmitted signals are thus picked off and fed to the seven-unit printer 20, such as described, for example, in the patent to J. A. Spencer, No. 2,274,103, February 24, 1942.

Local or function rings would, of course, be used in connection with the transmitting and receiving distributors, such as 2 and 19, but the distributors are not parts of our invention and for simplicity they have been omitted.

While the tuning fork standards at the distant transmitter and at the local receiver are designed to maintain the same frequency within one part in a hundred thousand, it is impossible to construct two frequency standards so that they will continually remain in absolute synchronism and phase. The tuning fork standard at the transmitter sets the transmitting frequency, without correction to any other standard, and the output of the tuning fork standard at the receiver is corrected to have exactly this frequency with constant phase relationship thereto.

To provide for the phasing and synchronizing of the local frequency, the output of the local tuning fork standard 5 is fed into an automatic motor-operated phase shifter, generally indicated at 21, and the correctly phased local frequency is fed into frequency divider 30, such as the well-known multivibrator with an appropriate filter, which reduces the 600 cycle frequency to $42^6/_7$ cycles per second of sinusoidal form. The output of this frequency furnishes the local frequency for driving the receiving distributor brush, in the printer example assumed, and also produces a plurality of short pulses for maintaining correct phase relation with the incoming signal. It is also used to supply pulses for the regeneration of the received signals.

In the first of these uses, the frequency divider 30 is connected to amplifier 31 and the amplified output is fed into synchronous motor 18 of the receiving distributor 19.

In the second use, the output of divider 30 is fed through a phase shifter 32 to a front-end pulse-forming circuit 33 and directly to a back-end pulse circuit 34. The front- and back-end pulses are obtained from the local corrected frequency source 30 and separated the desired amount by the manual phase shifter 32. These local front- and back-end pulses are fed into a differential circuit device 35, later explained in detail. The rectified signal from device 13 is also fed into the differential circuit device 35. A combination of the locally derived front- and back-end pulses with pulses produced from this signal controls a relay 36, which applies local voltage causing phase shifter 21 to maintain the desired phase of the 600 cycle frequency source. This likewise controls the phase of the $42^6/_7$ cycle frequency source 30. Either A. C. or D. C. voltage may be used to control phase shifter 21, but by way of example the latter has been indicated.

In the third use, the local corrected output of divider 30 is connected to the signal regenerator 14 to produce pulses in the exact centers of the rectified signal bauds. These pulses are then used to control the regeneration of the signals. The regenerated signals operate the relay 15 connected to the distributor brush 17 of distributor 19 and the received signal is printed at 20.

Figure 1:
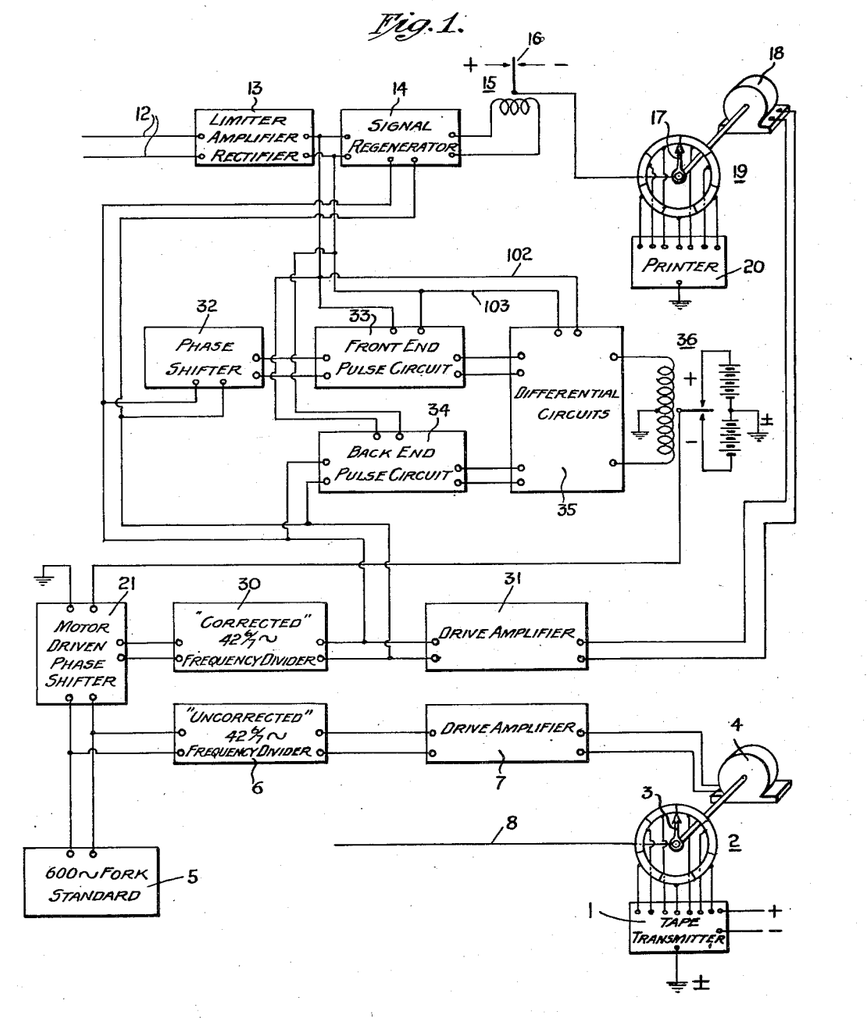
Figure 1 is an illustration, chiefly in block diagram, of our invention.
Figure 2:
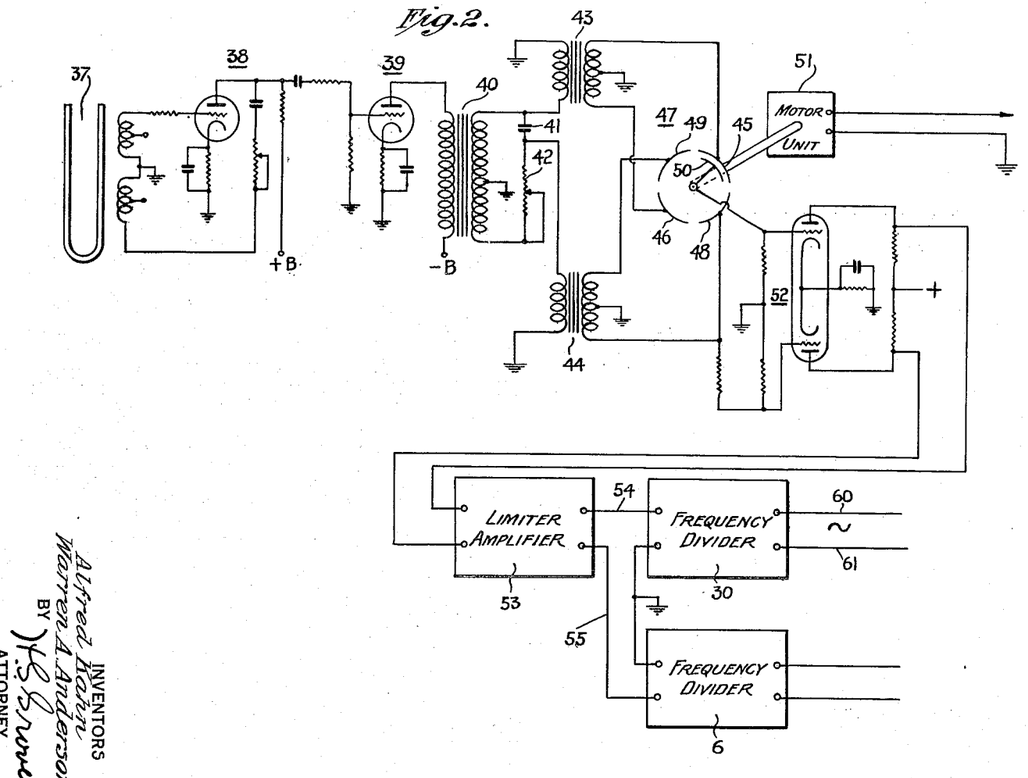
Figure 2 illustrates the circuits of the local source of frequency and the motor circuits for changing its phase.

Fig. 2 illustrates the circuits of the local source of frequency and phase control shown at 5 and 21 of Fig. 1. In Fig. 2 a tuning fork 37, in conjunction with oscillator stage 38 and amplifier 39, feeds 600 cycle frequency into transformer 40, the secondary of which has its midtap grounded and its terminals connected to a condenser 41 in series with a variable resistance 42. The upper terminal of condenser 41 is connected to ground through the primary of transformer 43 and the lower terminal thereof is connected to ground through the primary of transformer 44.

The terminals of the secondary of transformer 43 are connected to one pair of opposite quadrant plates 45, 46 of the phase shifter 47 (block 21 of Fig. 1) and the terminals of the secondary of transformer 44 are connected to the other pair of opposite quadrant plates 48, 49 of said phase shifter. The adjustment and terminal connections are such as to give, at a given instant, relative phase angles of zero for plate 48, 90° for plate 45, 180° for plate 49, and 270° for plate 46. The rotary plate 50 is so positioned as to constitute a plate of a condenser in conjunction with one or more of the four stationary plates. This rotary plate is adapted to be moved by a motor unit 51, shown diagrammatically. The drive is such as to insure that the adjustment will be kept after the motor stops rotating under control of relay 36 of Figs. 1 and 3.

The rotating plate 50 is connected to the grid of one tube of dual amplifier-limiter stage 52 and the plate 48 is connected to the grid of the other tube. The grids are also connected through appropriate resistances to ground. The cathodes are grounded through the well-known self-bias resistor. The stage 52, shown in detail, is one of a number of similar stages constituting the complete limiter-amplifier indicated by block diagram 53. The output of this limiter-amplifier is of rectangular wave form and the voltage between the terminal 54 and ground has the corrected frequency of 600 cycles, while the voltage between the terminal 55 and ground has the uncorrected frequency, but this is substantially 600 cycles except for the slight drift inherent in the frequency standard. With the construction indicated, the potential between rotor plate 50 and ground will be converted into a rectangular wave and applied to frequency divider 20. This wave will have the corrected frequency and phase. The potential between stator plate 48 and ground will likewise be amplified and converted to rectangular wave form, but it will have the uncorrected frequency.

Figure 3:
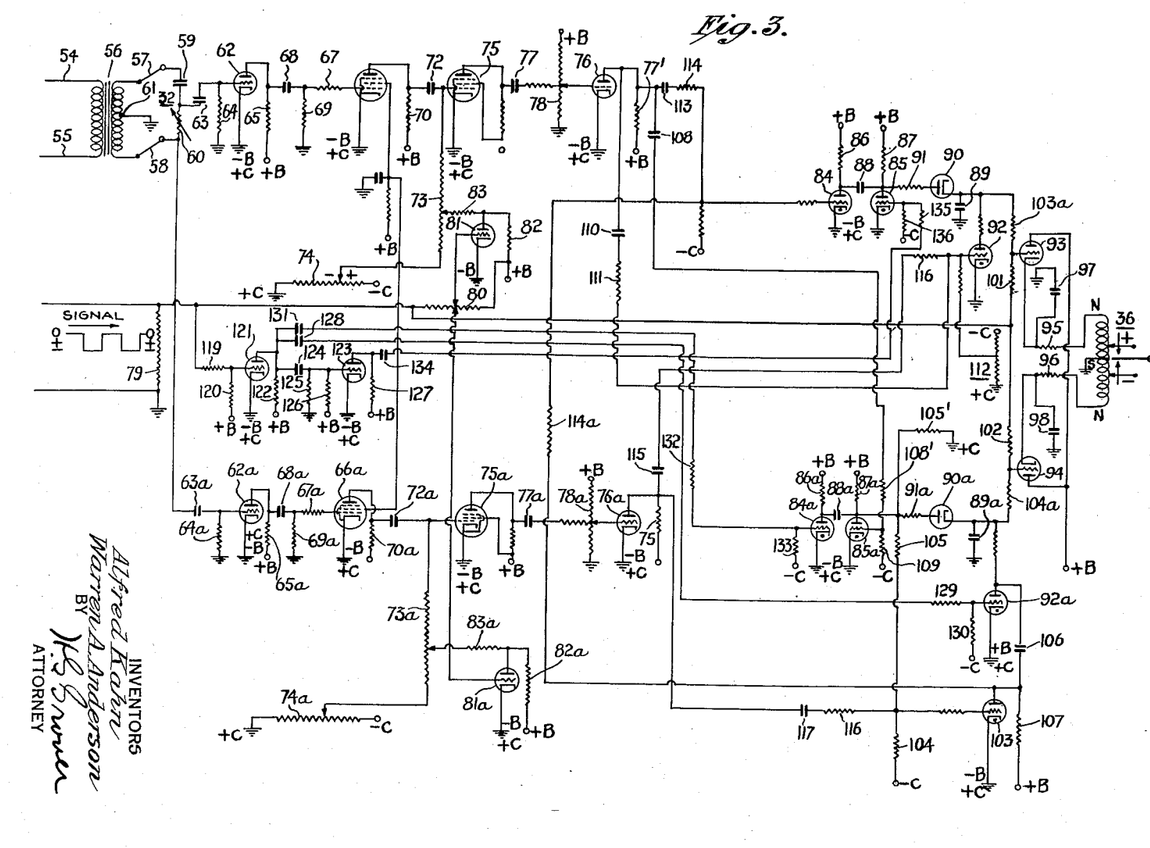
Figure 3 is a circuit diagram illustrating the invention as used for producing synchronization and phasing of the receiving apparatus.

Fig. 3 is a detailed circuit diagram of blocks 32, 33, 34 and 35 of Fig. 1. The purpose of the circuits of this figure is to control the relay 36 for energizing the motor unit 51 (Fig. 2) and rotate the condenser plate 50 in one direction or the other to maintain the local source of 42⁶/₇ frequency in constant phase relation with the incoming signals.

The corrected 42⁶/₇ cycle voltage from 30 of Fig. 2 is fed into phase shifter 32 (see also Fig. 1) by transformer 56. The secondary terminals 57, 58 of this transformer are connected to a circuit consisting of condenser 59 and adjustable resistance 60 in series. The midpoint 61 of the secondary is grounded. The grid of amplifier 62 is connected to the condenser end of resistance 60 through condenser 63. The input circuit has a grid leak resistance 64 and the cathode is grounded. The output of this amplifier has the corrected 42⁶/₇ cycle frequency. The plate of this amplifier is connected to the plus B supply terminal through a suitable resistance 65. Pentode limiter-amplifier 66 has its control grid coupled through resistance 67 and condenser 68 to the plate of tube 62. Resistance 69 is connected between ground and the condenser end of resistance 67. The plate of pentode 66 is connected through resistance 70 to the plus B supply. The screen and suppressor grid connections of this pentode are well known and need not be explained. The sine wave input of the 42⁶/₇ cycle voltage is converted by pentode 66 into rectangular wave form in its plate circuit.

A differentiating circuit, consisting of condenser 72 and resistances 73, 74, is connected to the plate of pentode 66 and to the input grid of pentode 75. One end of resistance 74 is grounded to the plus C terminal and the other end is connected to the minus C terminal. The positive pulse produced by the differentiating circuit produces an inverted pulse in the plate voltage of the pentode 75 and to reverse this, an inverter triode 76 has its grid coupled to the plate of pentode 75 through condenser 77. The plate is connected to the plus B terminal through resistance 77'. The grid is connected to a point in potentiometer resistance 78 which is connected between the plus B terminal and ground.

The chain of circuits at the top of Fig. 3, as just described, produce the end pulses of the front-end portion of the bauds, called herein the E. F. E. pulse, whose function will be later described. There is a similar chain of circuits at the bottom of Fig. 3 for producing the pulses at the start of the back-end portion of the bauds, called herein the S. B. E. pulses. Since the two chains of circuits are identical, except for the connections to the phasing device 32, similar parts will be given the same reference characters but with the letter *a* appended thereto and the circuit of the second chain will be understood without detailed explanation.

Before explaining the circuits connected to the output of the said two chains of circuits, it will be said that the rectangular signal voltage from block 13 of Fig. 1 will be used to control the passage of the pulses to said output by applying the signals to load resistance 79 of Fig. 3, with grounded end positive. The ungrounded end of this resistance is connected to one end of resistance 80. The other end of this resistance is connected to the plus B terminal.

A keying tube 81 has its grid connected to an intermediate point in resistance 80 and its cathode grounded. The plus B terminal is connected through resistances 82, 83 to a point in resistance 73. The anode of tube 81 is connected to the junction of resistances 82 and 83. A keying tube is similarly connected to the said lower chain of circuits and similar parts will be given the same reference characters with the letter *a* appended thereto, so the connections will be understood without detailed explanation.

The circuits already described in Fig. 3 produce the primary control potentials. The associated relay circuits will now be described.

At the upper right-hand part of Fig. 3, a pair of thyratrons 84, 85 have their anodes connected to the plus B terminal through resistances 86, 87, respectively, and their cathodes grounded. The plates of the thyratrons are connected by a commutating condenser 88. A condenser 89 is connected between ground and the plate of thyratron 85 through diode 90 and resistance 91. The connection is such that the condenser will charge at certain times through the diode from the plus B supply, but cannot discharge therethrough. The discharge of the condenser 89 can take place only through thyratron 92 when it is made conducting. This thyratron has no source of plate voltage except the voltage on the condenser 89 and it will therefore cease conducting when the condenser discharges down to the extinguishing voltage of the thyratron.

At the lower right-hand corner of Fig. 3, a second pair of mutually quenching thyratrons, a diode and a condenser, with its discharging thyratron, are similarly connected and have similar reference numerals with the letter *a* appended thereto to indicate such similarity. The connections will be understood without detailed explanation.

At the right center of Fig. 3, a pair of amplifier triodes 93, 94 have their plates connected in parallel to the plus B supply and their cathodes connected in push-pull to ground through resistances 95, 96, respectively, and the coils of relay 36. Integrating condensers 97, 98 are connected between ground and the cathodes of tubes 93, 94, respectively.

The grids of tubes 93, 94 are connected to the ungrounded end of the signal load resistance 79 through resistances 101, 102, respectively, of the order of 2 megohms. The input circuit disclosed is such as to block the tubes 93 and 94 on signal mark and unblock them on signal space. The grids of these tubes are also connected to the ungrounded ends of condensers 89 and 89*a* through resistances 103*a*, 104*a*, respectively, of the order of 10 megohms.

The connections thus far described in Fig. 3 are functionally those disclosed in said Anderson application Serial No. 391,077, which sometimes would not effectively correct phase deviations when, in starting the system, the local source of frequency was reversed with respect to the rectified signal. This reversed the position of the E. F. E. and S. B. E. pulses and prevented the phase correction from taking place until the phase of the local source was manually reversed.

To render the phase correction immune to this occasional defect, we use an additional thyratron 103 (see lower right-hand corner of Fig. 3), having its grid connected to the junction of the resistances 104, 105 bridged between minus C and the plate of thyratron 85*a*. The circuit is completed to plus C through resistance 105'. The anode of thyratron 103 is connected through condenser 106 to the anode of thyratron 92*a* and also the cathode of thyratron 103 is grounded and the anode is connected to the plus B terminal through resistance 107.

The upper and lower chains of pulse-forming circuits have the following connection to the thyratron tubes:

The anode of amplifier tube 76 is connected through condenser 108, resistances 108', 109 to the minus C terminal and the grid of thyratron 85a is connected to the junction point of these resistances. The anode of tube 76 is also connected through condenser 110 and resistance 111 to the grid of thyratron 92, which is also connected to receive a negative bias from the minus C supply 112. The anode of tube 76 is further connected through condenser 113 to the grid of thyratron 84 through resistance 114 and to the anode of thyratron 103 through resistance 114a. The grid of thyratron 84 is connected to the negative terminal of the negative bias supply.

In the lower chain of pulse-forming circuits, the anode of amplifier tube 76a is connected to the grid of thyratron 92 through condenser 115 and resistance 116. It is also connected through condenser 117 and resistance 118 to the grid of thyratron 103.

In addition to the described circuits for producing the E. F. E. and S. B. E. pulses, still another circuit is provided for producing the start of mark and the end of mark pulses. These are herein designated as the S. M. and E. M. pulses, respectively. For this purpose the upper end of signal load resistance 79 is connected through resistances 119 and 120 to the plus B terminal and the grid of amplifier tube 121 is connected to the junction point of these resistances. The cathode of this tube is grounded and the anode is connected to the plus B terminal through resistance 122.

Amplifier tube 123 has its grid connected to the plate of tube 121 through condenser 124. The grid is given an appropriate bias by connecting it to a point between the potentiometer resistances 125, 126, connected between the plus B terminal and ground. The plate of tube 123 is connected to the plus B terminal through resistance 127.

The plate of tube 121 is connected through condenser 128 and resistance 129 to the grid of thyratron 92a, which is connected to the minus C terminal through resistance 130. This plate is also connected through condenser 131 and resistance 132 to the grid of thyratron 84a, which is connected to the minus C terminal through resistance 133. The plate of tube 123 is connected through condenser 134 and resistance 135 to the grid of thyratron 85, which is connected to the minus C terminal through resistance 136. With the connections shown, positive pulses will be formed in the circuits of condensers 124, 128 and 131 at the start of mark and negative pulses at the end of mark, but amplifier tube 123 will reverse the pulses produced in the circuit of condenser 124 so that positive pulses will be formed at the end of the mark. The pulses from condensers 128 and 131 are S. M. pulses and the pulses produced by condenser 124 and inverted by the tube 123 are E. M. pulses.

Figure 4:
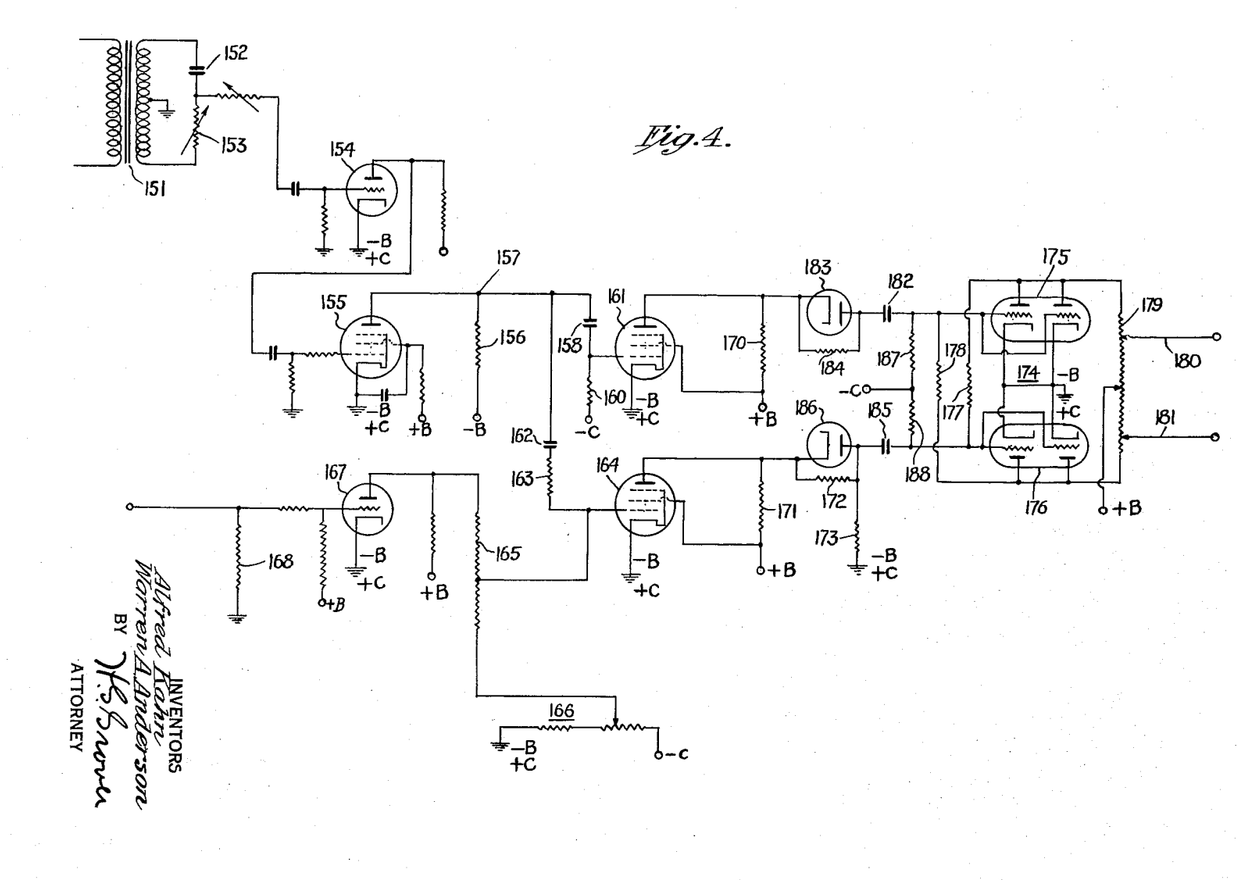
Figure 4 is a diagram of the circuits for regenerating the received signals.

Fig. 4 illustrates the diagrammatic circuits of the signal regenerator indicated by block 14 of Fig. 1. The corrected local 42% cycle voltage is applied to transformer 151. The terminals of the secondary of this transformer are connected to the condenser 152 and adjustable resistance 153 in series. The middle of the transformer secondary is grounded. The input terminals of amplifier 154 are connected between ground and the upper end of resistance 153. With this construction, manual adjustment of the resistance 153 will vary the phase of the input voltage to this tube. The output terminals are connected to the input terminals of pentode amplifier-limiter 155, similar to pentode 66 of Fig. 3. The plate terminal of the amplifier-limiter 155 is connected to the positive terminal of the plate supply through resistance 156. The cathodes of all the tubes are grounded, as indicated, and other connections are standard. The output of this amplifier-limiter is a square wave of the corrected 42% cycle frequency.

Point 157 in the plate circuit of amplifier 155 is connected to one plate of the condenser 158 and the other plate is connected to the minus C terminal through resistance 160. The condenser end of resistance 160 is connected to the control grid of pentode clipper 161.

Point 157 is also connected to one plate of a condenser 162 and the other plate is connected through resistance 163 to the control grid of the pentode clipper 164. The control grid of this tube is also connected to an intermediate point in the resistance 165, which has one end adjustably connected to the negative bias source 166 and the plate of amplifier 167. The cathode of the amplifier 167 is connected to the grounded minus B terminal and the grid is connected to signal load resistor 168 and to the plus B terminal through suitable resistances, so that the signal marks applied as a negative input as in Fig. 3 make the grid negative with respect to the cathode. This rectified signal energy may be considered as coming from the amplifier-rectifier 13 of Fig. 1.

The pentodes 161 and 164 are connected to the positive plate supply through resistances 170 and 171, respectively. The plate terminal of pentode 164 is also connected through resistances 172 and 173 to ground.

A Finch locking circuit, generally indicated at 174, consists of dual amplifier tubes 175, 176. The cathodes of the pairs of tubes are grounded and the plates of the pair 175 are connected to the grids of pair 176 through a suitable resistance 177. The plates of pair 176 are connected to the grids of pair 175 through resistance 178. The plates of pair 175 are connected to the plates of pair 176 through load resistance 179. The positive B terminal is adjustably connected to the middle of load resistance 179 and output terminals 180, 181 are adjustably connected thereto. These terminals are connected to relay coil 15 of Fig. 1.

The control grids of the pair of tubes 175 are connected through condenser 182 to the anode of diode 183 and the cathode of this diode is connected to the plate of clipper 161 and a resistance 184 is shunted around the diode. The grids of the pair of tubes 176 are connected through condenser 185 to the anode of diode 186 and the cathode of this diode is connected to the plate of clipper 164. The anode of this diode is connected to the junction point of resistances 172 and 173. With this arrangement, the cathode of the diode is normally biased positive with respect to the anode, for a purpose to be later explained. The grids of pairs of tubes 175 and 176 are connected together through resistances 187, 188 and the terminal of the negative bias source is connected to the junction of these two resistances.

Figures 5, 6:
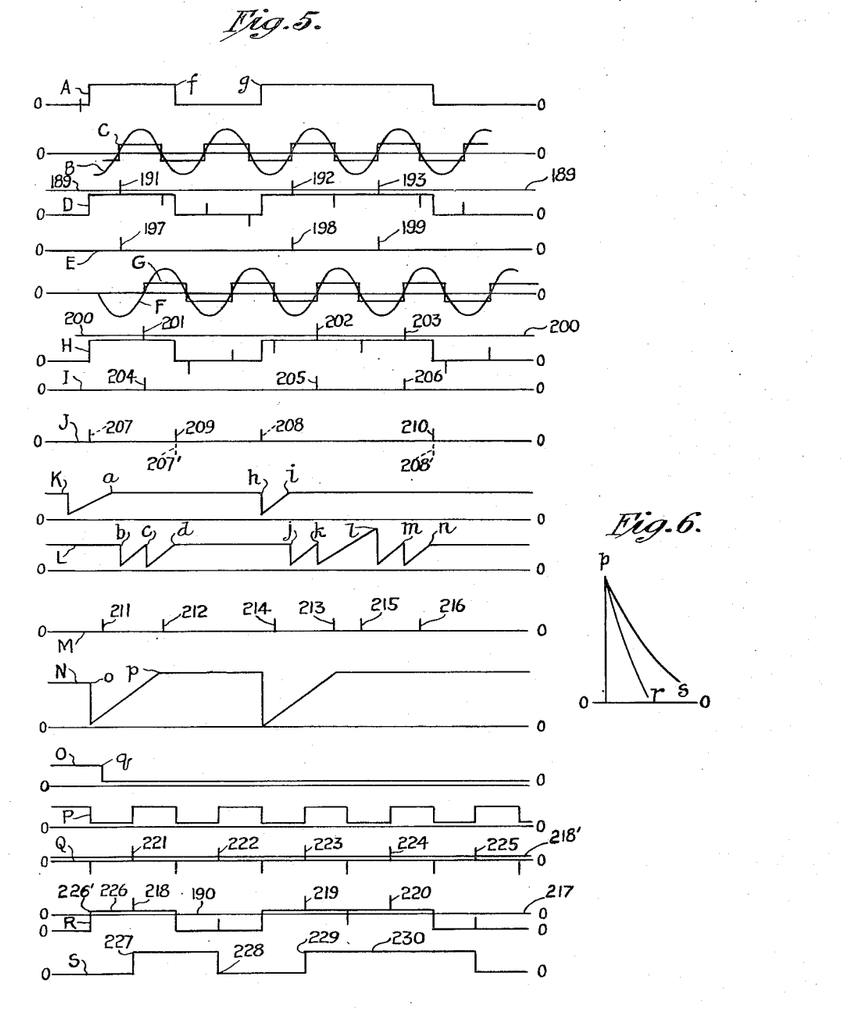
Figure 5 contains a series of graphs illustrating the principles of the invention.
Figure 6 contains graphs illustrating the principles of the action of the pulse-forming condensers of the regenerating apparatus.

The operation of the phase control circuits of Fig. 3 will first be given:

Resistance 60 in the phase control circuit will be adjusted to produce local frequency voltages having the desired separation, as indicated in graphs B and F of Fig. 5. These graphs give the wave form of the voltage applied respectively to the input terminals of triodes 62 and 62a, which is amplified and clipped by pentodes 66 and 66a. The rectangular plate voltage of pentodes 66 and 66a will be as given in graphs C and G, respectively.

In the CR differentiating circuit 72, 73, 74, positive and negative pulses will be formed. These will be superimposed on the signal (graph A) in the output of keying triode 81. Therefore, the voltage applied to the input circuit of pentode-limiter 75 will appear as indicated in graph D. This pentode has the cut-off indicated at 189 and only the positive pulses 191, 192, 193 in the marks will cause the pentode to conduct. These pulses will appear as dips in the plate voltage of the pentode, but they will be reversed and appear as positive pulses in the plate voltage of tube 76, as shown at 197, 198 and 199 in the graph E. In the lower chain of circuits of Fig. 3, the CR differentiating circuit 72a, 73a, and 74a will produce positive and negative pulses. These likewise will be superimposed on the incoming signal of graph A in the input circuit of pentode 75a and will appear as indicated in graph H. Pentode 75a has the negative bias cut-off indicated at 200 and therefore only the positive pulses 201, 202 and 203 will cause the pentode to conduct. These voltage charges appear as pulses 204, 205 and 206 in the output of tube 76a (graph I).

While the E. F. E. pulses 197, 198 and 199 and the S. B. E. pulses 204, 205 and 206 are being formed from the local frequency, as just described, the incoming rectangular signal across resistance 79 is producing S. M. pulses 207 and 208 at the beginning of each mark and negative E. M. pulses 207' and 208' in the circuits containing condensers 124, 128 and 131 at the end of the marks, as indicated in graph J. The pulses produced in the circuit containing condenser 124, however, will be reversed 180° in phase by the amplifier tube 123 and the negative pulses shown become positive pulses 209 and 210. As will later be apparent, only the positive pulses will be effective as controls.

Let it now be assumed that the local frequency of 42⅞ cycles has the desired phase relation with the incoming signal. When the start of mark pulse 207 of graph J is formed in the circuit of condenser 128, it fires thyratron 92a. Condenser 89a instantaneously discharges through this thyratron down to about 15 volts, whereupon the thyratron extinguishes. This insures that the condenser 89a always starts charging from the same reference level of about 15 volts. Thyratron 92a extinguishes when this voltage is reached, because the charged condenser supplies the only potential that is in its plate circuit. When thyratron 92a fires, thyratron 103 is extinguished by action of the commutating condenser 106. The reason for this is well known, but an explanation of it may be found in the patent to G. R. Clark, No. 2,237,522, April 8, 1941.

The extinguishing of thyratron 103 decreases the negative bias on thyratron 84, due to the elimination of the drop in resistance 107 in the voltage divider circuit. Thyratron 84 is thus in condition to be fired by the E. F. E. pulse, as will later be explained.

At the time condenser 128 forms S. M. pulse 207, the circuit of condenser 131 forms an identical pulse of like phase, which ignites thyratron 84a. The firing of thyratron 84a extinguishes thyratron 85a, by the commutating action of condenser 88a. This raises the plate potential of 85a by removing the plate current drop in resistance 87a and condenser 89a starts to charge. This continues up to point $a$ of graph K, when the E. F. E. pulse 191 is formed and ignites thyratron tube 85a. This extinguishes thyratron tube 84a by commutation. The plate voltage of 85a is lowered by the drop in resistance 87a and condenser 89a stops charging at point $a$. This condenser cannot discharge through thyratron 85a at this time, as the diode 90a will not conduct in the reverse direction. It therefore holds its charge for comparison with the charge in condenser 89 at the start of the next space. The firing of thyratron 85a lowers the bias potential on the grid of thyratron 103, which prevents the subsequent S. B. E. pulse from igniting it, but this has no effect on the controls except when the pulses from the local source have been reversed with respect to the signal, as will later be explained.

At the time thyratron 85a is fired by the E. F. E. pulse 197, thyratron 92 is fired by an identical pulse passing through coupling condenser 110 and this discharges condenser 89 down to reference level of about 15 volts. This occurs at the point $b$ of graph L. At exactly this time, E. F. E. pulse 197 fires thyratron 84 through coupling condenser 113, which simultaneously extinguishes thyratron 85. Therefore, condenser 89 starts to recharge and will continue charging until the S. B. E. pulse 204 forms, at which time condenser 89 is discharged to reference level again at point $c$. Since thyratron 85 is still non-conducting, condenser 89 will charge from reference level to the point $d$ of graph L, at which time the E. M. or end of mark pulse 209 in graph J will appear in the circuit of condenser 134, which fires thyratron 85. This stops the charging of condenser 89 at the point $d$ of graph L. Since we have assumed that the local frequency is in correct phase relation with the incoming signal, the time of charging of condenser 89a will be equal to the time of charging of condenser 89, because the E. F. E. pulse 197 and the S. B. E. pulse 204 are equally spaced from the beginning and the end of the mark, respectively. Therefore, when this end of the mark occurs at point $f$ of graph A, the relay tubes 93, 94 will be unblocked by elimination of the negative potential across the signal load resistance 79 in their grid circuits. Since condensers 89 and 89a have equal charges, the grids of tubes 93, 94 will have equal potentials and the cathode current of these two tubes will be equal. The magnetic forces will therefore balance out in the coils of relay 36. Therefore, the tongue of this relay will not be moved against either contact and there will be no change in the phase relation of the local source and the incoming signal. It should be noted that condensers 89 and 89a cannot discharge appreciably through the resistances 103a, 101 and 104a, 102, respectively, and on through signal load resistance 79 during mark, as the circuit resistance is too great for this.

Condensers 89 and 89a will hold their charge until the start of mark at point $g$ of graph A. The S. M. pulse produced in the circuit of condenser 128 fires thyratron 92a and discharges condenser 89a down to reference level at point $h$ of graph K. Simultaneously, the S. M. pulse in the circuit of condenser 131 fires thyratron 84a and thyratron 85a is simultaneously quenched by commutating action. Thus, condenser 89a immediately starts to charge at point $h$. Thyratron 103 has its grid potential raised at this time so that the S. B. E. pulse can later fire it. When E. F. E. pulse 198 occurs, it passes through condenser 108 to the grid of thyratron 85a and ignites it, simultaneously extinguishing thyratron 84a. The E. F. E. pulse also passes through condenser 113 and ignites thyratron 84. This stops the charging of condenser 89a at the point $i$ of graph K. At this same time, E. F. E. pulse 198 fires thyratron 92 through coupling condenser 110 and condenser 89 discharges down to reference level at $j$ of graph L, but immediately starts recharging because thyratron 85 is now quenched. Condenser 89 therefore charges up to the point $k$ when the S. B. E. pulse 205 is produced and discharges the condenser again by igniting thyratron 92 through condenser 115. Condenser 89 again recharges, because thyratron 85 is still quenched. When the E. F. E. pulse 199 occurs at the point $l$, condenser 89 is discharged again to reference level and charges up to the point $m$, when the S. B. E. pulse 206 ignites thyratron 92 and again discharges the condenser to reference level. It then charges up to point $n$ and E. M. pulse 210 fires thyratron 85 and stops the charge at this point.

After the point $i$ was reached in graph K, the subsequent occurrence of the E. F. E. pulse 199 and S. B. E. pulses 205 and 206 in the multiple mark had no effect on the condenser 89a. Therefore, the condensers 89 and 89a at the end of the multiple mark have been charged during an equal length of time and when the tubes 93 and 94 are unblocked at the end of the multiple mark there will again be no movement of the tongue of relay 36.

Now let it be assumed that the phase of the local source of frequency is leading the incoming signal. This means that the pulses 197, 198 and 199 of graph E will be nearer the front end of the signal mark, while the S. B. E. pulses 204, 205 and 206 will be farther away from the end of the signal mark. Therefore, condenser 89a will charge up to a less voltage than condenser 89 and when the bias is removed from tubes 93, 94 at the end of the mark, there will be a greater current passing through the upper coil of relay 36 than is passing through the lower coil. The tongue of the relay will now be swung against the contact, say the positive contact, to rotate the plate 50 of Fig. 2 in a direction to bring the local frequency back into phase with the incoming signal. This action is repeated at the end of each single or multiple mark until the phase displacement is corrected. Condensers 97 and 98 have an integrating effect in respect to the current pulses in the circuit of tubes 93 and 94, so that actual movement of the relay tongue takes place usually after a plurality of small charges are added to the condensers 89, 89a.

Let it also be supposed that in starting up the system, or for some other reason, the phase of the local frequency is reversed from that shown in graphs B and F of Fig. 5. When this occurs, the E. F. E. and S. B. E. pulses will be transposed, as indicated in graph M. At the start of the mark at point $o$ in graph N, the thyratrons 92a and 84a are fired and thyratrons 103 and 85a are extinguished, in the way previously described. Condenser 89a then discharges to reference level at $o$ and immediately starts charging. When the misplaced S. B. E. pulse 211 is reached, it has no effect on the charging of condenser 89a because the lower chain of pulse circuits, as before, has no effect on this condenser. The S. B. E. pulse 211 ignites thyratron 103 because the quenching of thyratron 85a reduced the negative potential on its grid so that this could take place. The firing of thyratron 103, however, has no effect at this point. S. B. E. pulse 211 also fired thyratron 92, which discharged condenser 89 to reference level at the point $q$ in graph O. When the misplaced E. F. E. pulse 212 is reached, the charging of condenser 89a is stopped by the firing of thyratron 85a. This occurs at the point $p$ of graph N and condenser 89a holds its charge at this level. When the misplaced E. F. E. pulse 212 occurred, thyratron 103 was conducting and the drop in resistance 107 placed such a negative bias on thyratron 84 that the E. F. E. pulse could not ignite it in the way previously described. Thyratron 85 therefore remains conducting. Condenser 89 thus cannot charge, but stays at the reference level started at the previous point $q$. When the end of mark occurs, thyratron 85 is fired, as before, but this has no effect on condenser 89. It is already at reference level and it likewise has no effect on condenser 89a. Therefore, at the end of the single mark, condenser 89a has a greater charge than condenser 89, as will be apparent by comparing graphs N and O at this point. Thus, relay 36 will operate and start the correcting action.

When the start of the multiple mark occurs at $g$ of graph A, the condenser 89a will be discharged, as in the case of the single mark, and it will charge up as before until the misplaced E. F. E. pulse 213 is reached, whereupon the charging of condenser 89a will cease. When the previous S. B. E. pulse 214 occurred, it would have caused condenser 89 to discharge down to reference level if it had not already been discharged at the point $q$ in the single mark. Therefore, condenser 89 is at reference level. When the S. B. E. pulse 214 was reached, it energized thyratron 92, but this had no effect on condenser 89, as it had already been discharged to reference level. The S. B. E. pulse 214 ignited thyratron 103, as previously explained in connection with the single mark, and this reduced the negative bias on thyratron 84 and prevented its being fired by E. F. E. pulse 213. It will be evident that the misplaced subsequent S. B. E. and E. F. E. pulses 215 and 216, respectively, will not cause condenser 89 to charge. Therefore, at the end of a multiple mark, the charges on condensers 89 and 89a are the same as at the end of a single mark; that is, they have unequal charges and relay 36 will be operated and cause correction to take place. Thus, the occasional failure occurring in the prior system referred to has been obviated in our invention.

The operation of the signal regenerator of Fig. 4 will now be described:

The voltage of the corrected local source of 42⅞ cycles per second is applied to transformer 151. This local source has a sine wave form, as previously stated, but the pentode limiter 155 converts this into a rectangular wave, as indicated by graph P of Fig. 5. This rectangular voltage wave of 42⅞ cycles charges both the condenser 158 and the condenser 162. A typical current pulse in condenser 158 is indicated by the graph $o, p, r$ of Fig. 6. Graph Q of Fig. 5 indicates the actual potential applied from the drop in resistance 160 to the control grid of the pentode 161, the cut-off being indicated at 189. Graph $o, p, s$ similarly illustrates the current pulse of condenser 162.

Resistor 153 of the phase shifter is so adjusted that the positive pulses of graph Q occur, say, in the exact center of the signal bauds introduced from amplifier 167. Since the square wave signal is applied to the input circuit of pentode 164, the charging and discharging pulses of condenser 162 will be combined with the signal wave, as indicated in graph R. The pentode 164 is biased almost to cut-off, as indicated at 217. The pulses of condenser 158 occur simultaneously with the pulses of condenser 162, but they are not superimposed on the signal. The cut-off of pentode 164 eliminates the effect of the negative pulses in the plate circuit of the pentode as well as the positive pulses in the centers of the space bauds. Pentode 164 will therefore conduct current slightly during the marking bauds and will amplify pulses 218, 219 and 220.

The pulses from condenser 158 alone will control the conducting condition of pentode 161. The cut-off point 218', as indicated in graph Q, is such as to eliminate all negative and background pulses in the plate circuit and the tube will conduct current only at points 221 to 225, inclusive.

The pulses produced by the charging of condensers 158 and 162 will simultaneously unblock pentodes 161 and 164 at the centers of the mark bauds, but, as will be apparent from an inspection of the discharge curves of Fig. 6, pentode 164 will be conducting for the greater time and therefore will control the locking circuit.

When the mark baud 226 of graph R occurs, the voltage at point 226' starts tube 164 conducting slightly, but the current does not produce sufficient drop in resistance 171 to reduce the potential of the cathode of the diode 186 to that of its anode, so locking circuit condenser 185 cannot discharge through this diode. When the pulse 218 of graph R is reached, this current is sufficient to render this diode conducting. Condenser 185 then discharges through the diode and pentode 164. The discharge current passes to ground, to the negative bias terminal and through resistance 188 to the negative plate of the condenser. This increases the bias on the grids of the pair of tubes 176 of the locking circuit and quickly reverses it due to the cross grid plate connection. At this time condenser 158 discharges also, but the discharge of condenser 162 prevails, as it unblocks pentode 164 for a longer time. Thus, locking tubes 175 are made conducting and tubes 176 are blocked. This makes the conductor 181 positive and conductor 180 negative. A regenerated mark baud is thus started at 227 of graph S.

The locking circuit continues without change until pulse 222 of graph Q is produced and makes pentode 161 conducting. This discharges condenser 182 through the low resistance path of diode 183 and pentode 161. There is no pulse in the input circuit of pentode 164 at this point, as shown by graph R, and therefore condenser 185 cannot discharge. The discharge of condenser 182 throws the locking circuit and reverses the polarity in load resistance 179. This starts the space at point 228 of graph S. It will be apparent without further description that pulse 219 will predominate over pulse 223 and will throw the locking circuit at 229 and pulse 225 will start the next space at 230. Thus, a squared-up regenerated signal wave results.

Locking condensers 182 and 185 recharge, relatively slowly, through resistances 184 and 172 with substantially equal current and these charging currents will not unbalance the locking circuit.

Condenser 185 will be discharged by pulse 220, but since the locking circuit is already conducting in the direction that this would throw the circuit, this discharge has no effect.

It might be thought that the cut-off point 217 could be placed at the exact top of the signal in graph R and thus make it unnecessary to use the negative bias on diode 186. However, it is difficult to do this as a practical matter and it has been found highly advantageous to use this bias in the way disclosed.

We have disclosed a particular embodiment for carrying out the principles of our invention, but this has been by way of example only. Various other embodiments may be devised without departing from the spirit of the invention.

Having described our invention, what we claim is:

1. In a system for regenerating telegraph signals, means for producing a first and a second train of pulses simultaneously at predetermined points of the mark and space bauds having frequencies equal to the signal baud rate, the voltages of all of the pulses at their start being substantially the same but thereafter the voltages of the pulses of the first train being greater than those of the second train, a pair of tubes and means to cause one tube to conduct by the action of the pulses of the first train during signal marks and the other tube to conduct by the action of the pulses of the second train during signal spaces.

2. In a system for regenerating telegraph signals, means for producing a first and a second train of pulses simultaneously at substantially the centers of the mark and space bauds having frequencies equal to the signal baud rate, the voltages of all of the pulses at their start being substantially the same but thereafter the voltages of the pulses of the first train being greater than those of the second train, means for combining the pulses of the first train with the signals, a pair of tubes and means to cause one tube to conduct by the combined signals and pulses of the first train during signal marks and the other tube to conduct by the pulses of the second train during signal spaces.

3. In a system for regenerating telegraph signals, means for converting the signals into rectangular form, means for producing a first and a second train of pulses simultaneously at substantially the centers of the mark and space bauds having frequencies equal to the signal baud rate, the voltages of all of the pulses at their start being substantially the same but thereafter the voltages of the pulses of the first train being greater than those of the second train, means for combining the pulses of the first train with the signals, a pair of tubes and means to cause one tube to conduct by the action of the combined signals and pulses of the first train during signal marks and the other tube to conduct by the action of the pulses of the second train during signal spaces.

4. In a system for regenerating telegraph signals, means for producing a first and a second train of pulses having frequencies equal to the signal baud rate, the pulses of the first train predominating those of the second train, means for phasing the pulses of both trains at predetermined points of the signal mark and space bauds, a first and a second amplifier tube, means for combining the pulses of the first train with the signals and applying them to the input circuit of the first amplifier tube, means for applying the pulses of the second train to the input circuit of the second amplifier tube, means for biasing the input circuit of the first amplifier tube to conduct only during the signal mark bauds, a pair of resistances, the output terminals of each amplifier tube being connected to the power supply through one of said resistances, a condenser and a diode connected in series between a point in each of said resistances and the cathode of each amplifier, and a resistor connected in parallel with each diode, said diode being so poled that the condensers can discharge but not charge through said resistor.

5. In a system for regenerating telegraph signals, means for producing a first and a second train of pulses having frequencies equal to the signal baud rate, the voltages of all of the pulses at their start being substantially the same but thereafter the voltages of the pulses of the first train being greater than those of the second train, means for phasing the pulses of both trains at predetermined points of the signal mark and space bauds, a first and a second amplifier tube, means for combining the pulses of the first train with the signals and applying them to the input circuit of the first amplifier tube, means for applying the pulses of the second train to the input circuit of the second amplifier tube, means for biasing the input circuit of the first amplifier tube to conduct only during the signal mark bauds, a pair of resistances, the output terminals of each amplifier tube being connected to the power supply through one of said resistances, a condenser and a diode connected in series between a point in each of said resistances and the cathode of each amplifier, and a resistor connected in parallel with each diode, said diode being so poled that the condensers can discharge but not charge through said resistor.

6. In a system for regenerating telegraph signals, means for producing a first and a second train of pulses at substantially the centers of the signal mark and space bauds having frequencies equal to the signal baud rate, the voltages of all of the pulses at their start being substantially the same but thereafter the voltages of the pulses of the first train being greater than those of the second train, a first and a second amplifier tube, means for combining the pulses of the first train with the signals and applying them to the input circuit of the first amplifier tube, means for applying the pulses of the second train to the input circuit of the second amplifier tube, means for biasing the input circuit of the first amplifier tube to conduct only during the mark bauds, a pair of resistances, the output terminals of each amplifier tube being connected to the power supply through one of said resistances, a condenser and a diode connected in series between a point in each of said resistances and the cathode of each amplifier, and a resistor connected in parallel with each diode, said diode being so poled that the condensers can discharge but not charge through said resistor.

7. In a system for regenerating telegraph signals, means for converting the signals into rectangular form, means for producing a first and a second train of pulses at substantially the centers of the signal mark and space bauds having frequencies equal to the signal baud rate, the voltages of all of the pulses at their start being substantially the same but thereafter the voltages of the pulses of the first train being greater than those of the second train, a first and a second amplifier tube, means for combining the pulses of the first train with the rectangular signals and applying them to the input circuit of the first amplifier tube, means for applying the pulses of the second train to the input circuit of the second amplifier tube, means for biasing the input circuit of the first amplifier tube to conduct only during the signal mark bauds, a pair of resistances, the output terminals of each amplifier tube being connected to the power supply through one of said resistances, a condenser and a diode connected in series between a point in each of said resistances and the cathode of each amplifier, and a resistor connected in parallel with each diode, said diode being so poled that the condensers can discharge but not charge through said resistor.

8. In a system for regenerating telegraph signals, means for producing a first and a second train of pulses having frequencies equal to the signal baud rate, the voltages of all of the pulses at their start being substantially the same but thereafter the voltages of the pulses of the first train being greater than those of the second train, means for phasing the pulses of both trains at substantially the centers of the mark and space bauds, a first and a second amplifier tube, means for combining the pulses of the first train with the signals and applying them to the input circuit of the first amplifier tube, means for applying the pulses of the second train to the input circuit of the second amplifier tube, means for blocking the first amplifier tube slightly below the peak of the signal mark voltage, a pair of resistances, the output terminals of each amplifier tube being connected to the power supply through one of said resistances, a condenser and a diode connected in series between a point in each of said resistances and the cathode of each amplifier, a resistor connected in parallel with each diode, said diode being so poled that the condensers can discharge but not charge through said resistor and means to produce sufficient voltage drop in the resistance in the output of the first amplifier to make the cathode of said diode positive with respect to its anode except during the occurrence of the pulses of the first train in the mark bauds.

9. In a regenerating system for telegraph signals of a predetermined baud rate, a local source of alternating voltage having a frequency proportional to said baud rate, means for producing a wave train of voltage pulses having a frequency proportional to the frequency of said alternating voltage, means for phasing the pulses of said wave train with the center of the signal bauds, means for combining the pulses with said signals, an amplifier biased to cut off slightly below the base of the positive ones of the pulses in the mark bauds, a diode and a condenser connected in series across the output circuit of the amplifier with such polarity of the diode as to prevent charging of the condenser therethrough, a resistance around the diode to provide for charging of the condenser and means to render the cathode of the diode negative with respect to the anode thereof when the combined voltage of the mark bauds and pulses is applied to the input circuit of the amplifier.

10. In a system for regenerating telegraph signals, means for converting the signal marks into rectangular form with a pulse at the center of each baud thereof, a locking circuit, a diode, a potentiometer, a condenser in the input circuit of said locking circuit, said condenser and diode being connected in series across a portion of said potentiometer and poled so that the condenser can discharge but not charge through the diode, an amplifier tube having its output circuit connected across a portion of said potentiometer and means for applying the rectangular signal marks and the associated pulses to be input terminals of said amplifier, the potentials of the input and output circuits of said amplifier being such that the condenser can discharge through the diode when said pulses are applied to the amplifier input.

11. In systems for phasing and regenerating telegraph signals of a predetermined baud rate, a local source of alternating voltage having a frequency proportional to said baud rate, means for producing from said source first and second trains of voltage pulses of said frequency separated from each other by a predetermined phase angle, means for producing from said local source third and fourth equi-phased wave trains of voltage pulses of said frequency, respectively lagging and leading the first and second wave trains by equal angles, a first and a second condenser, means for charging said first and second condensers proportional to the phase angles between predetermined pulses of the first and second trains and the start and end of the marks, respectively, means controlled by the difference in the charges of said condensers for shifting the phase of the local alternating voltage to cause the first and second wave trains to lead and lag the signal baud centers by equal phase angles and the third and fourth wave trains to be in phase therewith, means for producing a regenerating voltage of one polarity at the occurrence of a pulse of the third wave train in a predetermined baud of a mark and for producing a regenerating voltage of opposite polarity at the occurence of a pulse of the fourth wave train in a corresponding baud of the following space.

12. In systems for phasing and regenerating telegraph signals of a predetermined baud rate, a local source of alternating voltage having a frequency proportional to said baud rate, means for producing from said source first and second trains of voltage pulses of said frequency separated from each other by a predetermined phase angle, means for producing from said local source third and fourth equi-phased wave trains of voltage pulses of said frequency, respectively lagging and leading the first and second wave trains by equal angles, a first and a second condenser, means for charging the first condenser proportional to the phase angle between the start of a mark and a pulse of the first wave train occurring in the first baud thereof and for charging said second condenser proportional to the phase angle between the end of the mark and a pulse of the second wave train occurring in the last baud thereof, means controlled by the difference in the charges of said condensers for shifting the phase of the local alternating voltage to cause the first and second wave trains to lead and lag the signal baud centers by equal phase angles and the third and fourth wave trains to be in phase therewith, means for producing a regenerating voltage of one polarity at the occurrence of a pulse of the third wave train in the first baud of a mark and for producing a regenerating voltage of opposite polarity at the occurrence of a pulse of the fourth wave train in the first baud of the following space.

13. In phasing systems for reception of telegraph signals of predetermined baud rate, a local source of alternating voltage having a frequency proportional to said baud rate, means for normally producing a back-end pulse in the second half of a mark baud of said frequency, a back-end condenser, means for charging said condenser during the time elapsing between the back-end pulse occurring in the last half of the last baud of a signal mark and the end thereof and means for preventing the charging of said back-end condenser upon the abnormal occurrence of said back-end pulse in the first half of a baud of a signal mark.

14. In phasing systems for reception of telegraph signals of predetermined baud rate, a local source of alternating voltage having a frequency proportional to said baud rate, means for normally producing a back-end pulse in the second half of a mark baud of said frequency, a back-end condenser, means for charging said condenser during the time elapsing between the back-end pulse in the last baud of a signal mark and the end thereof and means for discharging said back-end condenser upon the abnormal occurrence of said back-end pulse in the first half of a baud of a signal mark.

15. In phasing systems for reception of telegraph signals of predetermined baud rate, a local source of alternating voltage having a frequency proportional to said baud rate, means for normally producing a back-end pulse in the second half of a mark baud of said frequency, a back-end condenser, means for charging said condenser during the time elapsing between the back-end pulse in the last baud of a mark and the end thereof and means for discharging said back-end condenser and preventing its recharging upon the abnormal occurrence of said back-end pulse in the first half of a mark baud.

16. In phasing systems for reception of telegraph signals of predetermined baud rate, a local source of alternating voltage having a frequency proportional to said baud rate, means for normally producing in the first and second halves of a mark baud front- and back-end pulses, respectively, of said frequency separated by a predetermined phase angle, front- and back-end condensers, means for charging the front-end condenser during the time elapsing between the start of the mark and the first front-end pulse, means for charging the back-end condenser during the time elapsing between the back-end pulse in the last baud of a mark and the end thereof, means for preventing the charging of the back-end condenser when in abnormal operation the back-end pulse precedes the front-end pulse in a mark and means controlled by a difference in the charges of said condensers during the space bauds for adjusting the phase of said local source until the said angle is bisected by the centers of the bauds of the mark with the front- and back-end pulses occurring in the first and second halves, respectively, thereof.

17. In phasing systems for reception of telegraph signals of predetermined baud rate, a local source of alternating voltage having a frequency proportional to said baud rate, means for normally producing in the first and second halves of a mark baud front- and back-end pulses, respectively, of said frequency separated by a predetermined phase angle, front- and back-end condensers, means for charging the front-end condenser during the time elapsing between the start of the mark and the first front-end pulse, means for charging the back-end condenser during the time elapsing between the back-end pulse in the last baud of a mark and the end thereof and means for preventing the charging of the back-end condenser when in abnormal operation the back-end pulse precedes the front-end pulse in a baud of a mark.

18. In phasing systems for reception of telegraph signals of predetermined baud rate, a local source of alternating voltage having a frequency proportional to said baud rate, means for producing front- and back-end pulses, respectively, of said frequency separated by a predetermined angle and normally positioned in the first and second halves, respectively, of a mark baud, front- and back-end condensers, means for starting the charging of the front-end condenser at the start of the mark and stopping the charge upon the occurrence of the first front-end pulse, means for starting the charging of the back-end condenser upon occurrence of a back-end pulse in the last baud of a mark and stopping the charge at the end of the mark, means for preventing said charging of the back-end condenser upon reversal of the positions of the front- and back-end pulses in abnormal operation and means controlled by a difference in the charge of said condensers during the space bauds for adjusting the phase of said local source until the said angle is bisected by the centers of the bauds of the mark with the pulses occurring in their normal position.

19. In telegraph phasing systems having signals of predetermined baud rate, a local source of alternating voltage having a frequency proportional to said baud rate, means for producing front- and back-end pulses of said frequency separated by a predetermined angle and normally positioned in the first and second halves, respectively, of a mark baud, front- and back-end condensers, means for discharging the front-end condenser at the start of the mark and thereupon recharging it until the occurrence of the first front-end pulse in the mark, means for discharging said back-end condenser and thereupon recharging it upon the occurrence of a front-end pulse and a back-end pulse in a mark baud in their normal position, means for stopping the charging of the back-end condenser at the ends of the marks, means for discharging the back-end condenser and preventing its recharging upon interchange of the front- and back-end pulses in abnormal operation and means controlled by a difference in the charges of said condensers during the space bauds for adjusting the phase of said local source until the said angle is bisected by the centers of the bauds of the marks with said pulses occurring in their normal position.

20. In a system for regenerating telegraph signals, means for producing a first and a second train of pulses simultaneously at predetermined points of the bauds having frequencies equal to the signal baud rate, the pulses of both trains having substantially the same voltage at their start but those of the first train having greater voltage thereafter, means for combining the signal marks and spaces with the pulses of the first train, a first and a second tube, means for blocking either tube when the other one conducts, means for feeding the combined signals and pulses of the first train to the input circuit of the first tube and the pulses of the second train to the input circuit of the second tube, and a utilization device connected in the output circuit of said tubes.

21. In a system for regenerating telegraph signals, means for producing a first and a second train of pulses simultaneously at predetermined points of the bauds having frequencies equal to the signal baud rate, the pulses of both trains having substantially the same voltage at their start but those of the first train having greater voltage thereafter, means for combining the signal marks and spaces with the pulses of the first train, means for threshold limiting the combined signals and pulses of the first train slightly below the maximum value of the signal marks, a first and a second tube, means for blocking either tube when the other one conducts, means for feeding the threshold limited signals and pulses of the first train to the input circuit of the first tube and the pulses of the second train to the input circuit of the second tube, and a utilization device connected in the output circuit of said tubes.

ALFRED KAHN.
WARREN A. ANDERSON.